United States Patent

Terashima et al.

Patent Number: 5,526,848
Date of Patent: Jun. 18, 1996

[54] REINFORCED RUBBER HOSE

[75] Inventors: Kiyomitsu Terashima; Fumio Ikeda; Atsushi Suzuki; Ryuichi Horiba, all of Nakashima-gun, Japan

[73] Assignee: Toyoda Gosei Co., Ltd., Nishikasugai-gun, Japan

[21] Appl. No.: 193,854

[22] Filed: Feb. 9, 1994

[30] Foreign Application Priority Data

Feb. 10, 1993 [JP] Japan ................... 5-022835

[51] Int. Cl.$^6$ ................................ F16L 11/08
[52] U.S. Cl. ................ 138/125; 138/141; 138/153; 138/DIG. 1; 138/DIG. 7
[58] Field of Search .............................. 138/125, 126, 138/137, 141, 153, DIG. 1, DIG. 2, DIG. 7

[56] References Cited

U.S. PATENT DOCUMENTS

| | | | |
|---|---|---|---|
| 4,096,888 | 6/1978 | Stefano et al. ................... | 138/125 |
| 4,368,091 | 1/1983 | Ontsuga et al. ................... | 138/98 |
| 4,606,953 | 8/1986 | Suzuki et al. ................... | 138/143 |
| 4,734,305 | 3/1988 | Sugimoto et al. . | |
| 4,862,923 | 9/1989 | Kitami et al. ................... | 138/126 |
| 4,992,314 | 2/1991 | Saitoh ................... | 138/126 |
| 4,998,565 | 3/1991 | Kokuryu et al. ................... | 138/125 |
| 5,070,597 | 12/1991 | Holt et al. ................... | 138/103 |
| 5,112,660 | 5/1992 | Saito et al. ................... | 138/126 |
| 5,271,977 | 12/1993 | Yoshikawa et al. ................... | 138/146 |
| 5,316,046 | 5/1994 | Igarashi et al. ................... | 138/125 |
| 5,343,895 | 9/1994 | King et al. ................... | 138/125 |
| 5,372,163 | 12/1994 | Kokuryu et al. ................... | 138/137 |

FOREIGN PATENT DOCUMENTS

3607874C2  10/1987  Germany .
3700211A1   7/1988  Germany .

*Primary Examiner*—David Scherbel
*Assistant Examiner*—James F. Hook
*Attorney, Agent, or Firm*—Cushman, Darby & Cushman

[57] ABSTRACT

A reinforced rubber hose having a layer of ethylene-propylene rubber outside or inside a fiber-reinforcing layer. The two layers are firmly bonded to each other by an extruded adhesive layer of butyl rubber which exhibits a high bond strength after vulcanization. This obviates the necessity of treating (usually by dipping) the fibrous reinforcement with an adhesive before its braiding or knitting.

6 Claims, 1 Drawing Sheet

5,526,848

REINFORCED RUBBER HOSE

BACKGROUND OF THE INVENTION

1. Field of the Invention

The present invention relates to a reinforced rubber hose and more particularly to a reinforced hose having a layer of ethylene-propylene rubber outside or inside a fiber-reinforcing layer. The reinforced rubber hose according to the present invention includes brake hoses, heater hoses, and water hoses.

2. Description of the Prior Art

Conventional brake hoses have a fiber-reinforcing layer covered with a layer of ethylene/propylene rubber (referred to as EPR layer hereinafter), as disclosed in Japanese Patent Laid-open No. 200688/1986. Ethylene-propylene rubber is used because of its good resistance to weather, ozone, and heat. The fiber-reinforcing layer is usually made of fibrous reinforcement of polar polymeric material, such as polyvinyl alcohol (PVA) fiber, polyamide fiber, and polyester (PET) fiber. These fibers do not adhere well, however, to the non-polar EPR layer. For this reason, it is common practice to treat (usually by dipping) the fibrous reinforcement with an adhesive, such as resorcin-formalin-rubber latex (RFL), before it is formed into the fiber-reinforcing layer.

SUMMARY OF THE INVENTION

It is an object of the present invention to provide a reinforced rubber hose which obviates the necessity of treating the fibrous reinforcement with an adhesive before it is formed into the fiber-reinforcing layer. The present invention is embodied in a reinforced rubber hose having a fiber-reinforcing layer and an ethylene-propylene rubber layer formed on its outer or inner surfaces, characterized in that the two layers are bonded to each other by an extruded adhesive layer of butyl rubber.

The unique structure of the reinforced rubber hose of the present invention provides superior manufacturing, and physical properties as compared to available rubber hose. The firm bond formed by extrusion in the present invention, for example, obviates the necessity of treating the fibrous reinforcement with a separate adhesive. In addition, the application of an optional adhesive layer does not substantially add to the number of process steps because it can be formed at the same time that the EPR layer is formed. Further, because the extruded adhesive layer of butyl rubber (IIR) has a low gas permeability, the reinforced rubber hose of the present invention has a low moisture vapor permeability, making it suitable for use as a brake hose, which should not be permeated by moisture vapor.

DETAILED DESCRIPTION OF THE INVENTION

Figure 1:
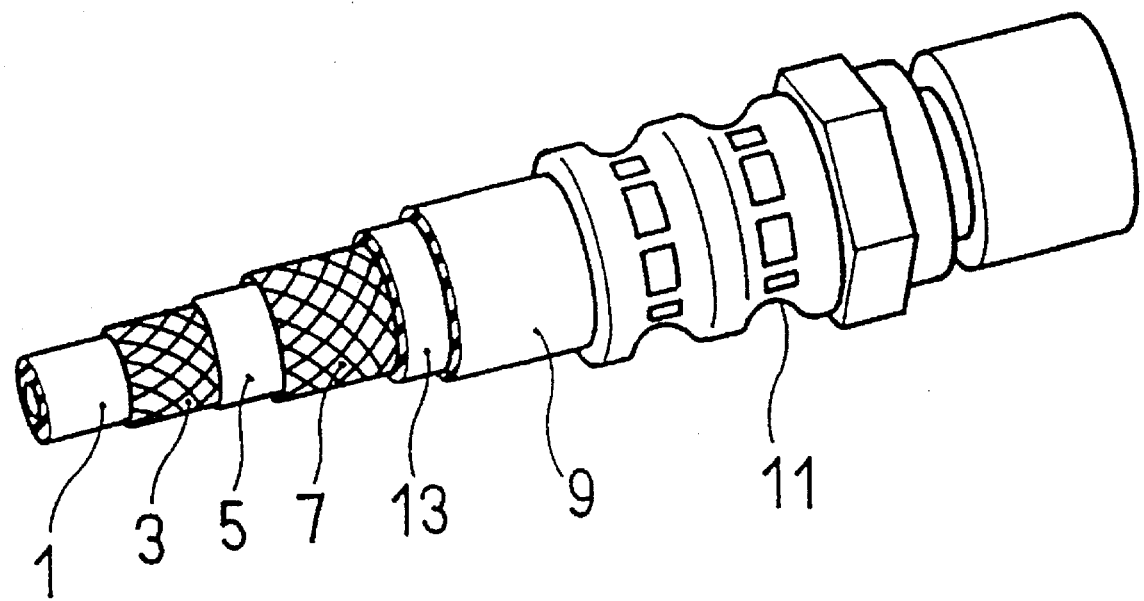
FIG. 1 is a perspective view showing an example of the brake hose of the present invention.

The invention will be described in more detail with reference to the accompanying exemplary drawing which shows a brake hose having two fiber-reinforcing layers. Although exemplified with reference to a brake hose, the present invention will be understood to provide a reinforced rubber hose and a method for making same which find wide applicability. Accordingly, the present invention is not limited in scope or applicability by the following examples.

The brake hose according to the present invention, as shown in FIG. 1, is constructed of five layers: an inner EPR layer (1), a PET fiber-reinforcing layer (3), an intermediate natural rubber (NR) layer (5), a PVA fiber-reinforcing layer (7), and an outer EPR layer (9). The brake hose is provided with a hose clamp (11).

In this example, the EPR outer layer (9) and the PVA fiber-reinforcing layer (7) are bonded to each other by an extruded adhesive layer (13) of butyl rubber (IIR) interposed between them. The EPR inner layer (1) and the PET fiber-reinforcing layer (3) may also be bonded to each other by an extruded adhesive layer interposed between them. However, this is not necessary in this example, because the inner EPR layer (1) is deformed less than the outer EPR layer (9) when the hose clamp (11) is tightened and hence the former does not need to adhere to the fiber-reinforcing layer so firmly as the latter.

The EPR used in the present invention is preferably an ethylene-α-olefin-nonconjugated diene terpolymer (amorphous). It may be, however, an ethylene-α-olefin bipolymer (amorphous).

The IIR used in the present invention is general-purpose isobutylene copolymerized with a small amount (0.6–2.5 mol %) of isoprene, preferably 1.5–2.0 mol % of isoprene.

The IIR used in the extruded adhesive layer (13) of the present invention is preferably compounded with carbon black, process oil, and vulcanizing agent, and other ingredients as known by those skilled in the art. The resulting rubber compound may optionally be incorporated with an integral adhesive to improve adhesion to the outer EPR layer (9). The integral adhesive can include, for example, RFL and maleic anhydride-modified polybutadiene. Such an integral adhesive should, preferably, be used in an amount of 3–15 parts by weight for 100 parts by weight of the rubber component.

The extruded adhesive layer (13) and the outer EPR layer (9) are formed on the second fiber-reinforcing layer (7) by coextrusion. When the hose is vulcanized (either continuously or batchwise), the extruded adhesive layer (13) firmly bonds the outer EPR layer (9) and the second fiber-reinforcing layer (7) to each other. The extruded adhesive layer (13) should preferably be from about 0.2 mm to about 0.4 mm thick.

The brake hose in this example has the inner and intermediate rubber layers (1 and 5) and the first fiber-reinforcing layer (3) formed in a manner known by those skilled in the art. That is, the rubber layers may be formed sequentially by extrusion optionally using a mandrel, and the fiber-reinforcing layer can be formed by braiding or spiral knitting.

The scope of the present invention is not limited to the brake hose explained above, but will be realized to provide high- and medium-pressure reinforced rubber hoses which have one or more fiber-reinforcing layers and EPR layers outside or inside the fiber-reinforcing layer. One skilled in the art will appreciate that the use of EPR for the rubber layer may be replaced by other suitable rubber. The present invention also provides a method for producing the disclosed high- and medium-pressure reinforced rubber hoses.

EXAMPLES

The instant invention will be further described with reference to the following examples, in which amounts are expressed in terms of parts by weight, unless otherwise specified.

The EPR and IIR layers were prepared from the following compounds.

| EPDM compound | |
| --- | --- |
| EPDM* | 100 parts |
| Carbon black (MAF) | 130 parts |
| Process oil (paraffinic) | 90 parts |
| Zinc oxide | 4.5 parts |
| Stearic acid | 3 parts |
| Sulfur | 0.5 parts |
| Vulcanization accelerator | 2 parts |

*Ethylene content: 54%
Iodine value: 12

| IIR(A) compound | |
| --- | --- |
| IIR* | 100 parts |
| Carbon black (MAF) | 70 parts |
| Zinc oxide | 5 parts |
| Stearic acid | 1 part |
| Sulfur | 0.5 parts |
| Vulcanization accelerator | 2 parts |

*Isoprene content: 2.0 mol %

| IIR(b) compound | |
| --- | --- |
| IIR* | 100 parts |
| Carbon black (MAF) | 56 parts |
| Process oil (paraffinic) | 6 parts |
| Zinc oxide | 5 parts |
| Stearic acid | 1 part |
| Sulfur | 0.5 parts |
| Vulcanization accelerator | 2 parts |
| Adhesive (RFL) | 4 parts |

*Isoprene content: 2.0 mol %

Test for adhesion between PVA yarn and IIR layer

A laminate was prepared by bonding the following layers to each other. As fiber-reinforcing layer a plain weave fabric (with a dimension of 27×27 per 2.54 cm) of untreated PVA yarn and a rubber layer of a 1-mm thick sheet of the above-mentioned compound of EPDM, IIR(a), or IIR(b), were used. After vulcanization under pressure at 150° C. for 30 minutes, the laminate was cut into 10-mm wide specimens. The specimen was tested for peel strength according to JIS K6301 (180° peel test at a pulling rate of 50 mm/min). The specimen of EPDM gave a peel strength of 0.90 kg/cm. The specimens of IIR(a) and IIR(b) gave a peel strength of 2.00 kg/cm and 2.15 kg/cm, respectively. A laminate comprised of plain weave of RFL-treated PVA yarn and the EPDM layer gave a peel strength of 2.00 kg/cm.

Test for adhesion between IIR layer and EPDM layer

A laminate was prepared by bonding the following layers to each other. A rubber layer of the above-mentioned EPDM compound (0.8-mm thick sheet) and rubber layer of the above-mentioned IIR(a) compound or IIR(b) compound (0.2 mm thick street) were used. After vulcanization, under pressure at 150° C. for 30 minutes, the laminate was cut into 10-mm wide specimens. The specimen was tested for peel strength according to JIS K6301 (180° peel test at a pulling rate of 50 mm/min). The specimen of IIR(a) gave a peel strength of 4.4 kg/cm. The specimen of IIR(b) gave a peel strength of 6.2 kg/cm. One skilled in the art will appreciate that these samples provide sufficiently high peel strengths.

Gas permeability of each rubber layer

A 1-mm thick rubber sheet was prepared from each of the EPDM compound and IIR(a) compound. The rubber sheet was vulcanized under pressure at 150° C. for 3 minutes. Each specimen of the vulcanized rubber sheet was used to close a container containing 17 cc of water. The container was allowed to stand at 70° C. for 20 days. The change in weight of the container was measured. The weight loss for EPDM was 1.8 g, whereas that for II(a) was only 0.4 g.

The entire contents of the documents cited herein are hereby incorporated by reference.

What is claimed is:

1. A reinforced rubber hose having a fiber-reinforcing first layer comprising a fibrous reinforcement of polar polymeric material having a surface and an ethylene-propylene rubber second layer formed on the surface, wherein said first and second layers are bonded to each other by an extruded adhesive third layer of butyl rubber containing 1.5–2.0 mol % isoprene and an integral adhesive selected from the group consisting of resorcin-formalin latex and maleic anhydride-modified polybutadiene in an amount of 3–15 parts by weight for 100 parts by weight of said butyl rubber.

2. The reinforced rubber hose according to claim 1, wherein said ethylene-propylene rubber second layer is an ethylene-α-olefin-nonconjugated diene copolymer.

3. The reinforced rubber hose according to claim 1, wherein said fiber-reinforcing first layer comprises a polyvinyl alcohol yarn.

4. A reinforced rubber hose composed of an inner rubber layer of ethylene-propylene rubber, a first fiber reinforcing layer of polyester yarn, an intermediate rubber layer of natural rubber, a second fiber-reinforcing layer of polyvinyl alcohol yarn, and an outer rubber layer of ethylene-propylene rubber, wherein the outer rubber layer and the second fiber-reinforcing layer are bonded to each other by an extruded adhesive layer of butyl rubber which is incorporated with an integral adhesive of resorcin-formalin-latex in an amount of 3–15 parts by weight for 100 parts by weight of said butyl rubber.

5. The reinforced rubber hose according to claim 4, wherein said ethylene-propylene rubber is an ethylene-α-olefin-nonconjugated diene copolymer.

6. A reinforced brake hose comprising the reinforced rubber hose according to claim 4.

* * * * *